United States Patent
Watanabe et al.

(10) Patent No.: US 9,639,212 B2
(45) Date of Patent: May 2, 2017

(54) INFORMATION PROCESSOR, PROCESSING METHOD, AND PROJECTION SYSTEM

(71) Applicant: KABUSHIKI KAISHA TOSHIBA, Tokyo (JP)

(72) Inventors: Wataru Watanabe, Kawasaki (JP); Ryosuke Nonaka, Yokohama (JP); Masahiro Baba, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 21 days.

(21) Appl. No.: 14/331,701

(22) Filed: Jul. 15, 2014

(65) Prior Publication Data
US 2015/0084930 A1    Mar. 26, 2015

(30) Foreign Application Priority Data
Sep. 25, 2013   (JP) .................................. 2013-197921

(51) Int. Cl.
G06F 3/042      (2006.01)
(52) U.S. Cl.
CPC .. G06F 3/0425 (2013.01); *G06F 2203/04101* (2013.01)
(58) Field of Classification Search
CPC ......... G06F 3/0428; G06F 2203/04101; G06F 3/0425; G06F 3/042; G06F 3/04817; G06F 3/0482; G06F 3/0488; G06F 3/0346; G06F 3/0383; G06F 3/017; G06F 2203/0384; G06F 2203/04802; G06F 3/04815; G06F 3/04842
See application file for complete search history.

(56) References Cited

U.S. PATENT DOCUMENTS

| | | | |
|---|---|---|---|
| 2010/0099464 A1* | 4/2010 | Kim ..................... | G06F 1/1615 455/566 |
| 2011/0229039 A1* | 9/2011 | Kitada ............... | G06K 9/00174 382/187 |
| 2012/0194545 A1 | 8/2012 | Shibata et al. | |
| 2012/0249482 A1* | 10/2012 | Kiyose ................. | G06F 3/0304 345/175 |

(Continued)

FOREIGN PATENT DOCUMENTS

| | | |
|---|---|---|
| JP | H07-84715 | 3/1995 |
| JP | 2012-3521 | 1/2012 |

(Continued)

OTHER PUBLICATIONS

Office Action mailed Aug. 20, 2014 in counterpart Japanese Application No. 2013-197921 and English translation thereof.
(Continued)

*Primary Examiner* — Md Saiful A Siddiqui
(74) *Attorney, Agent, or Firm* — Nixon & Vanderhye, P.C.

(57) ABSTRACT

According to one embodiment, an information processor includes: a detector; a vector calculator; a determiner. The detector detects an object existing over a plurality of detection ranges set at distances different from one another from a reference surface and acquires representative points of the object based on detected position in the detection ranges. The vector calculator acquires a three-dimensional vector based on the representative points. The determiner determines an input operation by the object based on the three-dimensional vector.

20 Claims, 12 Drawing Sheets

(56) References Cited

U.S. PATENT DOCUMENTS

| | | | | |
|---|---|---|---|---|
| 2013/0063401 A1* | 3/2013 | Ouchida | ............. | H04N 9/3179 345/175 |
| 2013/0070232 A1* | 3/2013 | Izukawa | ............. | G06F 3/0304 356/51 |
| 2014/0028557 A1* | 1/2014 | Otake | ................... | G09G 5/00 345/158 |
| 2014/0078516 A1* | 3/2014 | Hirai | ................... | G06F 3/0421 356/614 |

FOREIGN PATENT DOCUMENTS

| | | | | |
|---|---|---|---|---|
| JP | 2012-160079 | | 8/2012 | |
| JP | 2012-220970 | | 11/2012 | |
| JP | 2013-065061 | | 4/2013 | |
| WO | WO 2011-158401 | | 12/2011 | |
| WO | WO 2012/157272 | * | 11/2012 | ............. G06F 3/048 |

OTHER PUBLICATIONS

Office Action mailed Mar. 24, 2015 in counterpart Japanese Application No. 2013-197921 and English translation thereof.
S. Murugappan et al., "Extended Multitouch: Recovering Touch Posture and Differentiating Users using a Depth Camera", UIST' 12, Oct. 7-10, 2012, Cambridge MA, 10 pages.

* cited by examiner

INFORMATION PROCESSOR, PROCESSING METHOD, AND PROJECTION SYSTEM

CROSS-REFERENCE TO RELATED APPLICATIONS

This application is based upon and claims the benefit of priority from Japanese Patent Application No. 2013-197921, filed on Sep. 25, 2013; the entire contents of which are incorporated herein by reference.

FIELD

Embodiments described herein relate generally to an information processor, a processing method, and a projection system.

BACKGROUND

These days, apparatus and technology are developed in which touch operation is enabled on wall surfaces, the upper surfaces of desks, whiteboards, etc. Furthermore, the apparatus can cooperate with a projector etc. to make any object surface a virtual touch display. Conventionally, it has been necessary to attach a large-sized sensor for touch detection to an object surface, and there have been limitations to usable object surfaces. These days, a system is proposed in which operation on any object surface is detected by using a dedicated device such as an electronic pen that emits infrared light. However, in such an apparatus, operations with an indicator such as a finger and a pointer, are not detected. In this regard, an apparatus is proposed that senses an object surface with a sensor such as a camera placed in a distant position and detects an indicator such as a finger and a pointer. However, in such an apparatus, detection of an indicator is inaccurate as compared to systems using a dedicated device. Furthermore, misalignment may occur between touch coordinate and position of the indicator. It makes operation unstable.

DETAILED DESCRIPTION

Figure 1:
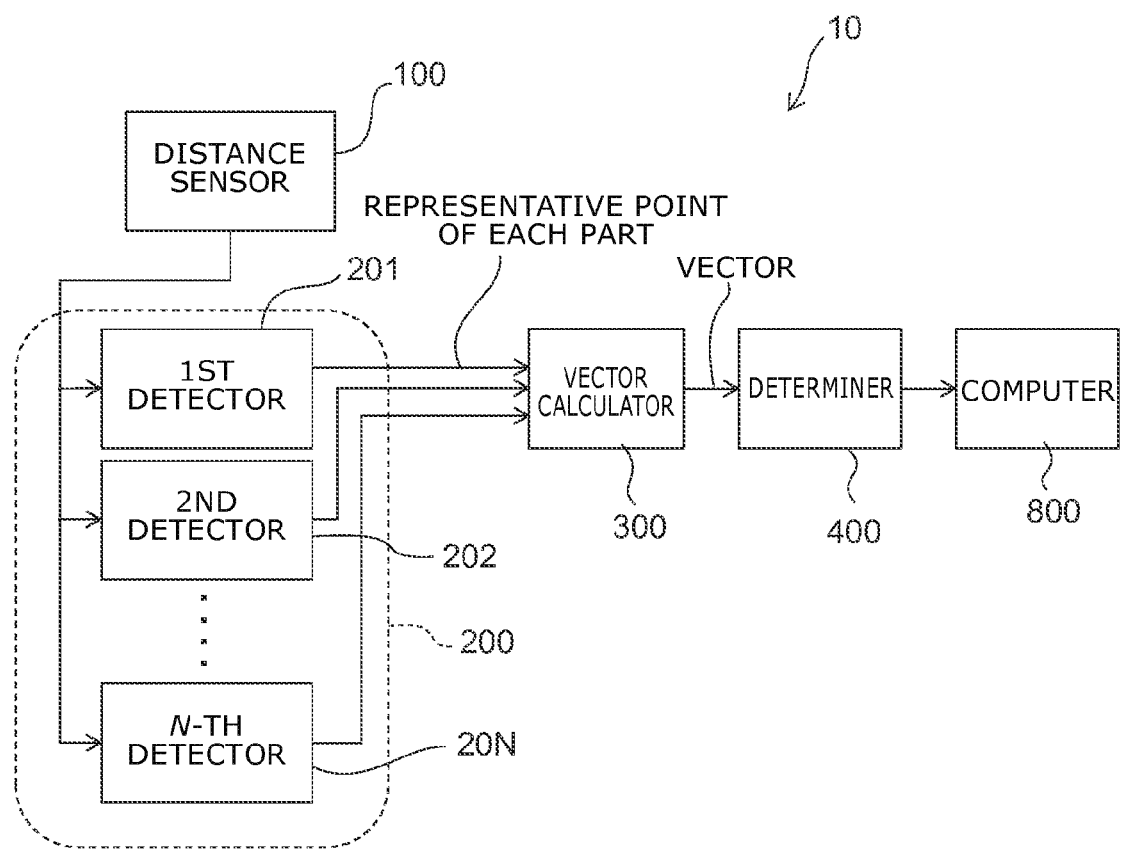
FIG. 1 is a block diagram showing an information processor according to an embodiment.

In general, according to one embodiment, an information processor includes: a detector; a vector calculator; a determiner. The detector detects an object existing over a plurality of detection ranges set at distances different from one another from a reference surface and acquires representative points of the object based on detected position in the detection ranges. The vector calculator acquires a three-dimensional vectorbased on the representative points. The determiner determines an input operation by the object based on the three-dimensional vector.

Hereinbelow, embodiments of the invention are described with reference to the drawings. In the drawings, like components are marked with the same reference numerals, and a detailed description is omitted as appropriate.

FIG. 1 is a block diagram showing an information processor according to an embodiment.

The embodiment relates to an information processor that detects operation on a reference surface. In the embodiment, an apparatus and a method for detecting touch operation on the reference surface are described using a wall surface, the upper surface of a desk, or the like as the reference surface. The reference surface may be a non-flat surface, and the reference surface may be in the air. The block diagram shown in FIG. 1 is an example of the main portion configuration of an information processor 10 according to the embodiment, and may not necessarily agree with the configuration of the actual program module.

The information processor 10 shown in FIG. 1 includes a detector 200, a vector calculator 300, and a determiner 400. The detector 200 includes a plurality of detectors. For example, the detector 200 includes a 1st detector 201 to an N-th detector 20N.

The information processor 10 may include a distance sensor 100 and a computer 800.

That is, the distance sensor 100 may be an external device different from the information processor 10, or may be a device included in the information processor 10. The computer 800 may be an external computer different from the information processor 10, or may be a computer included in the information processor 10. Alternatively, the computer 800 may be included in a display unit 600 described later. The hardware configuration shown in FIG. 1 is an example, and part or the whole of the information processor according to each embodiment may be configured as an integrated circuit such as an LSI (large scale integration) or an IC (integrated circuit) chip set. Each functional block may be made into a processor individually, or some or all of the functional blocks may be integrated into a processor. The method for forming an integrated circuit is not limited to an LSI, and an integrated circuit may be formed using a dedicated circuit or a general purpose processor.

The distance sensor 100 measures the distance to the reference surface or an object (for example, an indicator such as a finger and a pointer). In the embodiment, a sensor of an infrared pattern projection system is used as the distance sensor 100. The infrared pattern projection system is a method in which an invisible pattern is projected on an object, the pattern is captured with an infrared camera, and the distortion of the captured pattern is used to acquire the distance information d(x, y). Where, d(x, y) is a distance for a pixel with the coordinates (x, y) in the coordinate system of the camera. The d(x, y) is acquired sequentially. The distance information visualized as a pixel value is called a distance image. Any other means may be used as the distance measurement means. For example, the distance sensor 100 may be a sensor of a time-of-flight system that measures distance from the time difference till when applied light has returned after being reflected. Alternatively, the distance sensor 100 may be a sensor using a system in which the projected pattern is visible light. The distance sensor 100 may be a sensor that measures distance using a stereo camera.

Using the distance information obtained from the distance sensor 100, the 1st detector 201 to the N-th detector 20N detect a part of the object that has entered the detection range of a certain distance from the reference surface and calculate the position of the representative point of the part. The detector 200 may not actually include the 1st detector 201 to the N-th detector 20N, and it is sufficient that one detector 200 can detect a plurality of detection ranges set at distances different from one another. At this time, the plurality of detection ranges may overlap with one another. Alternatively, a 1st detection range out of the plurality of detection ranges may include a 2nd detection range out of the plurality of detection ranges. Details of the method by which the detector 200 detects a part of the object and calculates the position of the representative point of the part are described later.

The vector calculator 300 calculates a three-dimensional vector $v_i$ corresponding to the direction of the object toward the reference surface on the basis of the position of the representative point of the part detected by the 1st detector 201 to the N-th detector 20N. The vector $v_i$ is calculated on the basis of the positions of a plurality of representative points obtained. Details of the method by which the vector calculator 300 calculates the three-dimensional vector $v_i$ are described later.

The determiner 400 determines the content of the input operation on the reference surface by the object. In the information processor 10 according to the embodiment, gestures that can be used on common touch panels and the like may be used, such as tapping that is an operation like patting, flicking that is an operation like flipping in a certain direction, pinching that is an operation like holding with two fingers, and holding that is keeping for a certain period of time.

The determiner 400 also can output the angle of the object to the computer, by using the angle of the three-dimensional vector $v_i$. The determiner 400 may change output content in accordance with the angle of the object. Specific examples of the gesture that the determiner 400 outputs are described later.

The computer 800 executes a prescribed operation on the basis of an operating signal outputted from the determiner 400. The processing method and the projection system of the embodiment are executed by the computer 800. Specific examples of the computer are described later.

Figure 2:
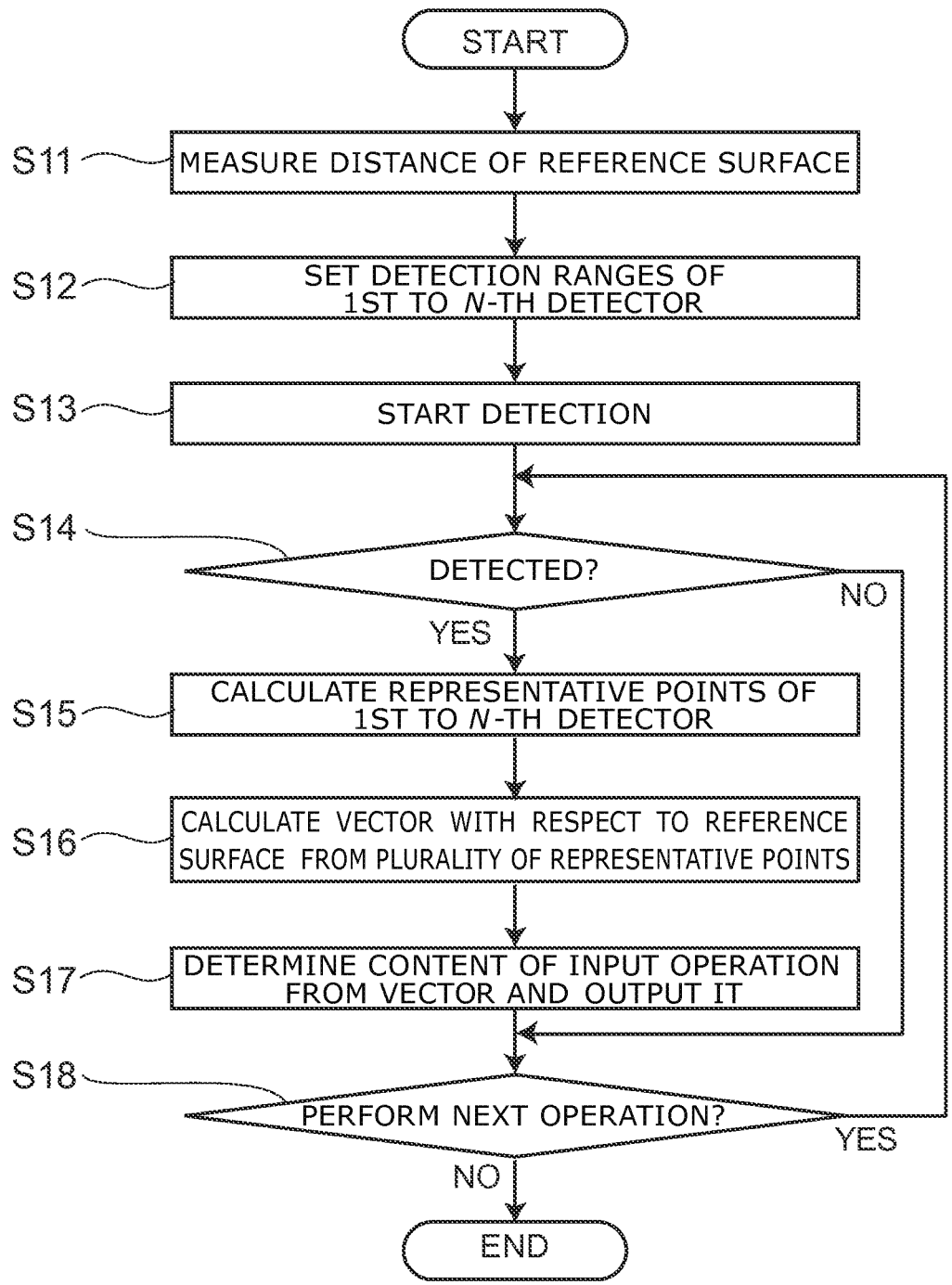
FIG. 2 is a flow chart showing a processing method of the embodiment.

FIG. 2 is a flow chart showing a processing method of the embodiment.

Figure 3A:
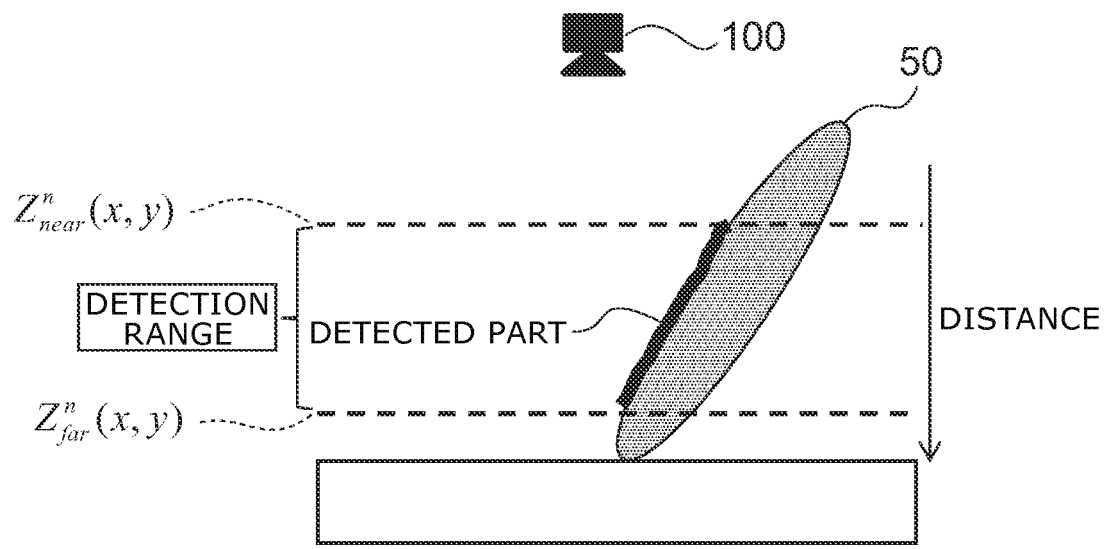
FIG. 3A and FIG. 3B are schematic plan views describing the detection range and the detected part.
Figure 3B:
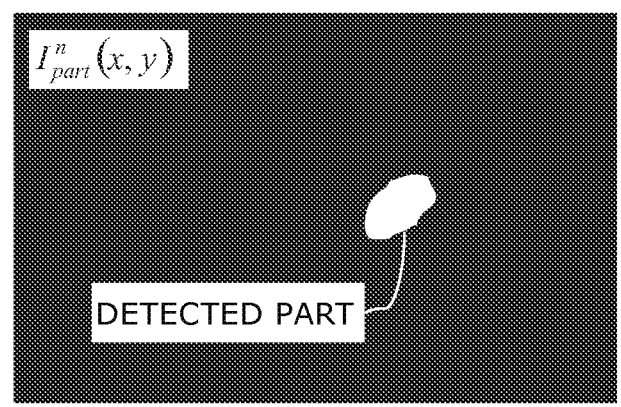

FIG. 3A and FIG. 3B are schematic plan views describing the detection range and the detected part.

Figure 4A:
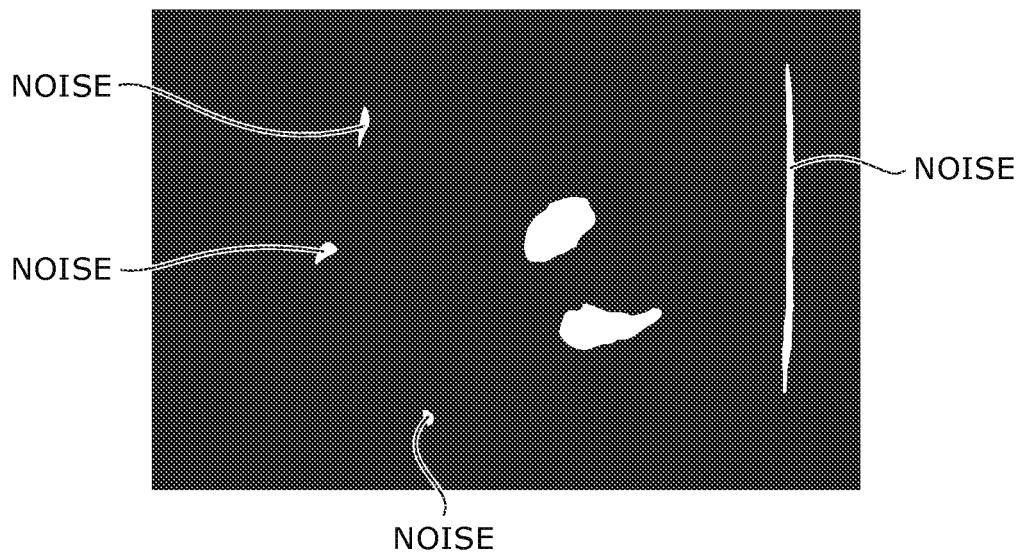
FIG. 4A and FIG. 4B are schematic diagrams describing discrimination processing and rejection processing.
Figure 4B:
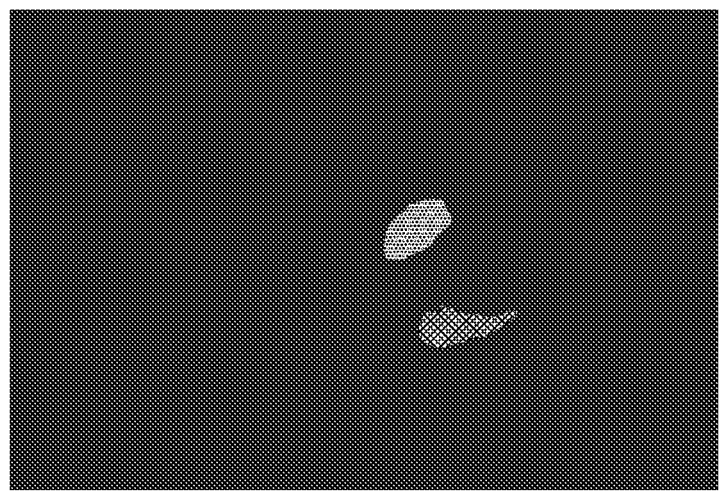

FIG. 4A and FIG. 4B are schematic diagrams describing discrimination processing and rejection processing.

Figure 5:
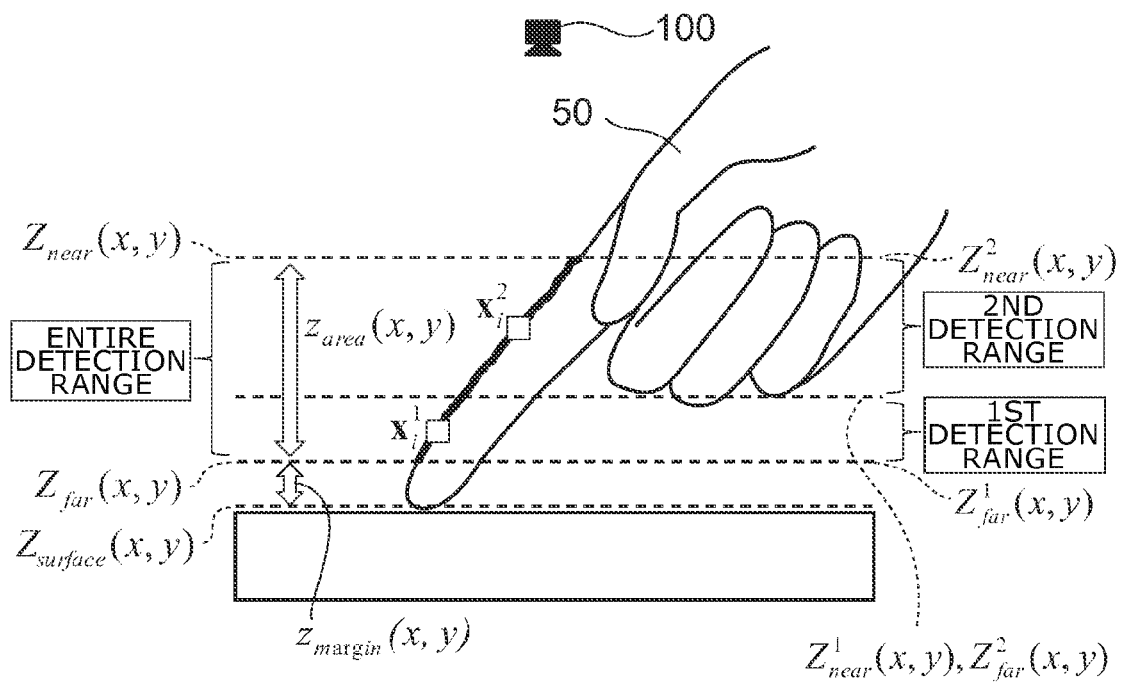
FIG. 5 is a schematic plan view describing an example in the case where a plurality of detection ranges are set.

FIG. 5 is a schematic plan view describing an example in the case where a plurality of detection ranges are set.

Figure 6:
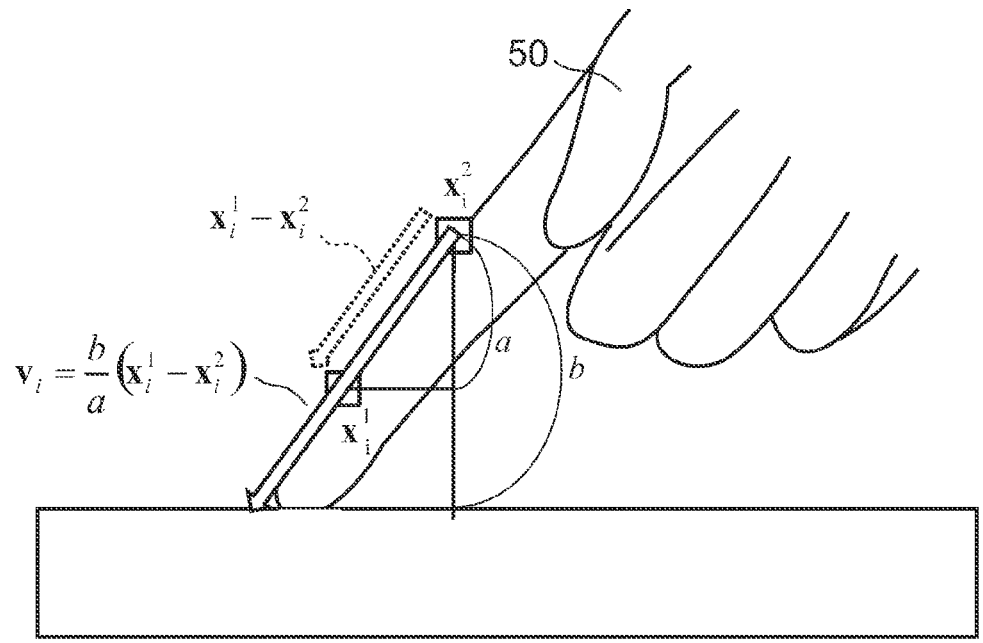
FIG. 6 is a schematic plan view describing a method for calculating the vector.

FIG. 6 is a schematic plan view describing a method for calculating the vector.

Figure 7:
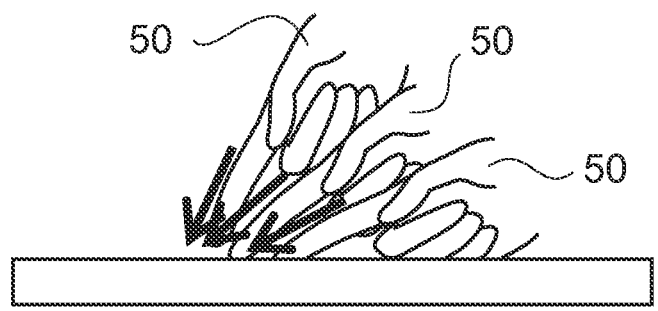
FIG. 7 is a schematic plan view illustrating an example in which output content is changed in accordance with the angle of the object.

FIG. 7 is a schematic plan view illustrating an example in which output content is changed in accordance with the angle of the object.

Figure 8:
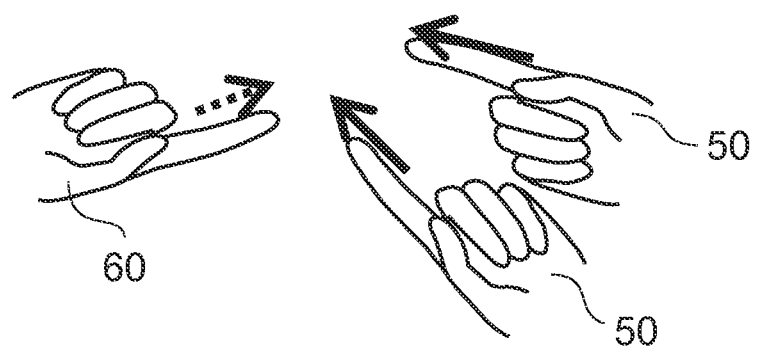
FIG. 8 is a schematic plan view illustrating an example in which fingers with angles close to each other are taken as a pair.

FIG. 8 is a schematic plan view illustrating an example in which fingers with angles close to each other are taken as a pair.

Figure 9:
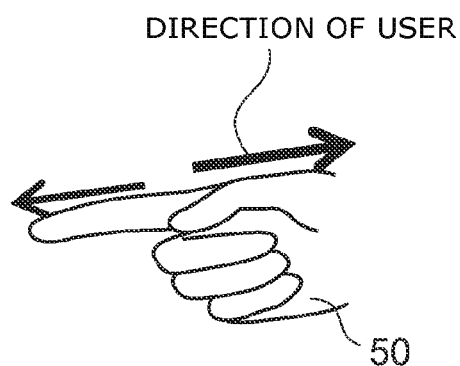
FIG. 9 is a schematic plan view illustrating an example in which the position of a user is determined artificially from the vector $v_i$.

FIG. 9 is a schematic plan view illustrating an example in which the position of a user is determined artificially from the vector $v_i$.

FIG. 3A is a schematic plan view describing the detection range. FIG. 3B is a schematic plan view showing the detected part $I''_{part}(x, y)$.

FIG. 4A is a schematic plan view showing a state before discrimination processing and rejection processing are executed. FIG. 4B is a schematic plan view showing a state after discrimination processing and rejection processing are executed.

In the embodiment, a method for detecting touch operation on the reference surface using a wall, the upper surface of a desk, or the like as the reference surface is described. The reference surface may be a non-flat surface, and the reference surface may be in the air.

First, the distance sensor 100 measures the distance $Z_{surface}(x, y)$ to the reference surface in a state where there is no object 50 between the distance sensor 100 and the reference surface (step S11, see FIG. 5). At this time, only one frame of the distance in a state where there is no object 50 may be acquired and used. Alternatively, approximately several frames to several hundred frames may be acquired continuously, and the average or the minimum value in that period of time may be used. This case is preferable because the fluctuation in the time direction of the measured distance can be absorbed. Determination may be made with reference to a histogram of the distance measured in a certain period of time. The distance of the reference surface may be continued to be updated in parallel with the detection of the object 50.

Subsequently, the detection ranges of the 1st detector 201 to the N-th detector 20N are set (step S12). For example, as shown in FIG. 5, parameters for detection, $Z_{margin}(x, y)$ and $Z_{area}(x, y)$, are defined. $Z_{margin}(x, y)$ is a margin provided in order not to detect noise near the reference surface. $Z_{area}(x, y)$ is a parameter that determines the width of the entire detection range. For $Z_{margin}(x, y)$ and $Z_{area}(x, y)$, an optimum value has been determined in accordance with the object 50 and the accuracy of the distance sensor 100. Alternatively, they may be altered dynamically during detection processing.

At this time, parameters of the entire detection range, $Z_{near}(x, y)$ and $Z_{far}(x, y)$, are set as follows.

[Mathematical Formula 1]

$$Z_{far}(x,y)=Z_{surface}(x,y)-z_{margin}(x,y) \quad \text{Formula (1)}$$

[Mathematical Formula 2]

$$Z_{near}(x,y)=Z_{far}(x,y)-z_{area}(x,y)=Z_{surface}(x,y)-z_{margin}(x,y)-z_{area}(x,y) \quad \text{Formula (2)}$$

Subsequently, the entire detection range is divided into a plurality of detection ranges. For example, as shown in FIG. 5, the entire detection range is divided into a 1st detection range and a 2nd detection range. In other words, in the embodiment, the detection range is determined such that the entire detection range is divided into two parts.

[Mathematical Formula 3]

$$Z_{far}^1(x,y) = Z_{far}(x,y) \quad \text{Formula (3)}$$

[Mathematical Formula 4]

$$Z_{near}^1(x,y) = Z_{far}^2(x,y) = Z_{far}^1(x,y) - a \cdot z_{area}(x,y) \quad \text{Formula (4)}$$

[Mathematical Formula 5]

$$Z_{near}^2(x,y) = Z_{near}(x,y) \quad \text{Formula (5)}$$

where a is a parameter that adjusts the division proportion of the detection range, and $0 \leq a \leq 1$.

Subsequently, detection is started (step S13).

Subsequently, each detector assesses whether the object has entered the detection range of a certain distance or not (step S14). In the case where each detector has determined that the object has entered the detection range of a certain distance (step S14: YES), the detector detects the part. For example, in the case where the object 50 has entered the 1st detection range and the 2nd detection range, the 1st detector 201 and the 2nd detector 202 detect the part. In this case, the object 50 exists over the 1st detector 201 and the 2nd detector 202. Alternatively, in the case where the object 50 has entered one of the 1st detection range and the 2nd detection range, one of the 1st detector 201 and the 2nd detector 202 corresponding to the detection range that the object 50 has entered may detect the part. When the object 50 has entered all of the plurality of detection ranges and each detector detects the part, false detection for noise etc. can be suppressed more, for example.

As shown in FIG. 3A and FIG. 3B, for the part $I''_{part}(x, y)$ detected in the detection range, only pixels in the range of a certain distance may be maintained as "1", as illustrated in the following formula, for example.

[Mathematical Formula 6]

$$I_{port}^n(x, y) = \begin{cases} 1 & Z_{near}^n(x, y) \leq d(x, y) \leq Z_{for}^n(x, y) \\ 0 & \text{otherwise} \end{cases} \quad \text{Formula (6)}$$

where $Z''_{near}(x, y)$ and $Z''_{far}(x, y)$ are parameters that specify each detection range. n expresses the number of each detector. That is, $0 \leq n \leq 1$.

Next, the detected part is separated for each of the parts connected. This is needed when multi-touch operation or operation by a plurality of persons is performed. For the discrimination of parts, labeling processing or the like may be used. At this time, parts with a certain area or more or parts with a certain area or less are rejected. Thereby, false detection due to noise on the measured distance can be prevented. Rejection may be made based on the shape of the part. In distance measurement by infrared pattern projection, errors are likely to occur in the distance measurement result of the edge of the object. Hence, by rejecting parts of which the circumscribed rectangle has a certain horizontal to vertical ratio or more, false detection along the edge can be prevented.

As shown in FIG. 4A and FIG. 4B, when the discrimination processing and the rejection processing of the connected parts are performed on the detected part $I''_{part}(x, y)$, pre-processing may be performed at the time of the part detection, and thereby the detection accuracy of the object can be improved.

Next, the representative point of each detected part is calculated (step S15, see FIG. 5). The barycenter of the detected part is used as the representative point, for example. The three-dimensional coordinates of the obtained representative point are expressed as $x''_i = (x''_i, y''_i, z''_i)^T$, where $x''_i$ and $y''_i$ are the barycentric coordinates of the detected part. For $z''_i$, the formula of $z''_i = d(x''_i, y''_i)$ holds. In the method for calculating the representative point, not limited to the barycenter, also the average value of the detected part and the like may be used. Here, the subscript "i" is the number in the case where there are a plurality of parts. In the case where there are a plurality of objects 50 as in the case of operation with two fingers, a plurality of parts are detected.

Subsequently, the vector calculator 300 calculates the vector of the object 50 with respect to the reference surface on the basis of the positions of a plurality of representative points (step S16). For example, as shown in FIG. 6, the vector $v_i$ is calculated from the difference between the representative point $x^1_i$ of the part detected by the 1st detector 201 and the representative point $x^2_i$ of the part detected by the 2nd detector 202. As shown in FIG. 6, when the ratio of similar triangles is used, the three-dimensional vector $v_i$ of the object 50 with respect to the reference surface can be expressed by the following formula.

[Mathematical Formula 7]

$$v_i = \frac{b}{a}(x_i^1 - x_j^2) \quad \text{Formula (7)}$$

Here, the following formula holds for "a" and "b" in Formula 7.

[Mathematical Formula 8]

$$a = |z_i^2 - z_i^1| \quad \text{Formula (8)}$$

[Mathematical Formula 9]

$$b = |z_i^2 - Z_{surface}(x_i^2, y_i^2)| \quad \text{Formula (9)}$$

In the embodiment, an example of the method for calculating the vector $v_i$ on the basis of the positions of two representative points is illustrated. However, the method for calculating the vector $v_i$ is not limited to this. For example, in the case where a large number of detectors are provided, the positions of a large number of representative points can be acquired. Hence, the vector $v_i$ may be calculated various sets of representative points and conducting a vote. In this case, the vector can be calculated robustly against outliers of distance information.

Subsequently, the determiner 400 determines the content of the input operation by the object 50 on the basis of the vector $v_i$, and outputs it (step S17).

The determiner 400 may change output content in accordance with the angle of the object 50. As shown in FIG. 7, input operation can be outputted by inclining a finger (the object 50), for example.

Information on the angle may be used when gesture input is performed. In conventional touch operations, gestures made by combining a plurality of fingers, such as pinch operation and rotation operation with two fingers, are used in many cases. When a plurality of touches are detected, fingers at a short distance from each other are combined in many cases. In contrast, by the example, determination can be made with reference to also the angle of the finger. For example, as shown in FIG. 8, fingers (objects 50) with angles close to each other may be taken as a pair. On the other hand, a finger (an object 60) with a certain angle difference or more is determined as performing a different operation from the object 50.

It is assumed that a user (an operator of the object 50) exists in the opposite direction to the three-dimensional vector $v_i$ with respect to the reference surface corresponding to the object 50, for example. Then, the position of the user can be determined artificially from the vector $v_i$ as shown in FIG. 9. Thereby, input operation can be changed in accordance with the direction of the user. For example, by permitting only input from a certain direction, it becomes possible to limit input operation in accordance with the direction of the user etc.

Subsequently, it is determined whether to perform the next input operation or not (step S18). In the case where in step S14 each detector has determined that the object has not entered the detection range of a certain distance (step S14: NO), it is determined whether to perform the next input operation or not (step S18). In the case of performing the next input operation (step S18: YES), each detector assesses whether the object has entered the detection range of a certain distance or not (step S14). On the other hand, in the case of not performing the next input operation (step S18: NO), the flow ends.

By the embodiment, input operation on the reference surface can be detected comfortably and stably by calculating the three-dimensional vector $v_i$ corresponding to the object 50 such as a finger and a pointer with respect to the reference surface.

Next, another embodiment is described with reference to the drawings.

Figure 10:
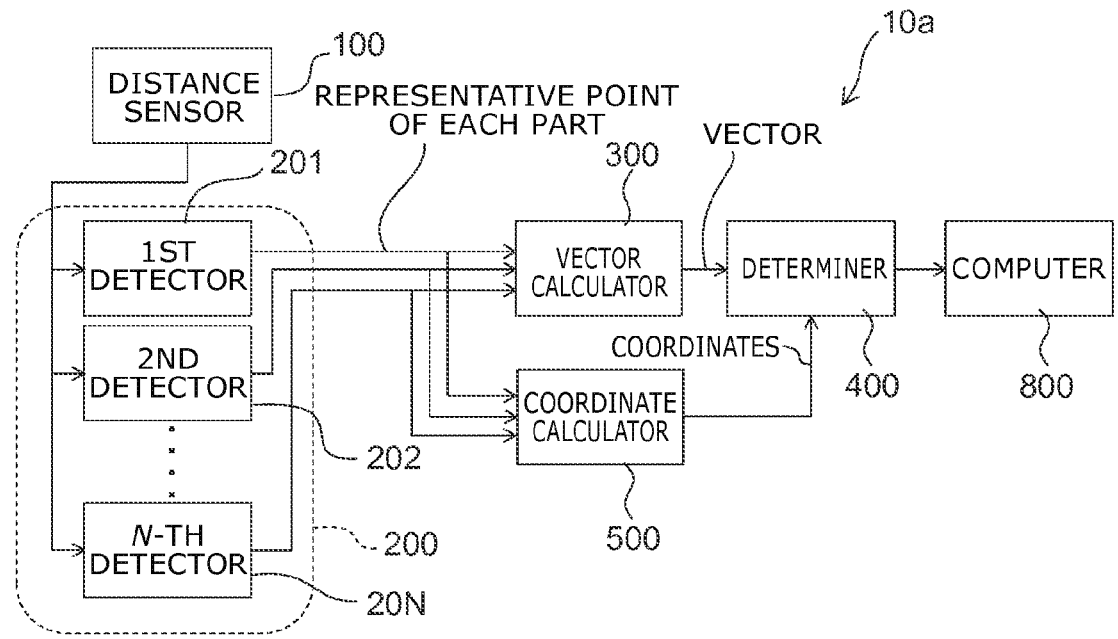
FIG. 10 is a block diagram showing an information processor according to another embodiment.

FIG. 10 is a block diagram showing an information processor according to another embodiment.

An information processor 10a shown in FIG. 10 further includes a coordinate calculator 500 as compared to the information processor 10 described above in regard to FIG. 1.

The coordinate calculator 500 calculates the input coordinates of the object 50 on the reference surface. Details of the method by which the coordinate calculator 500 calculates the input coordinates (touch coordinates) are described later.

In the information processor 10a shown in FIG. 10, the determiner 400 can output the touch coordinates to the computer, by using the coordinates calculated by the coordinate calculator 500. The determiner 400 can output multi-touch operation, gesture, etc. to the computer, by using the temporal change of the touch coordinates and the positional relationships among a plurality of coordinates.

Otherwise, the configuration is similar to the configuration of the information processor 10 described above in regard to FIG. 1.

Figure 11:
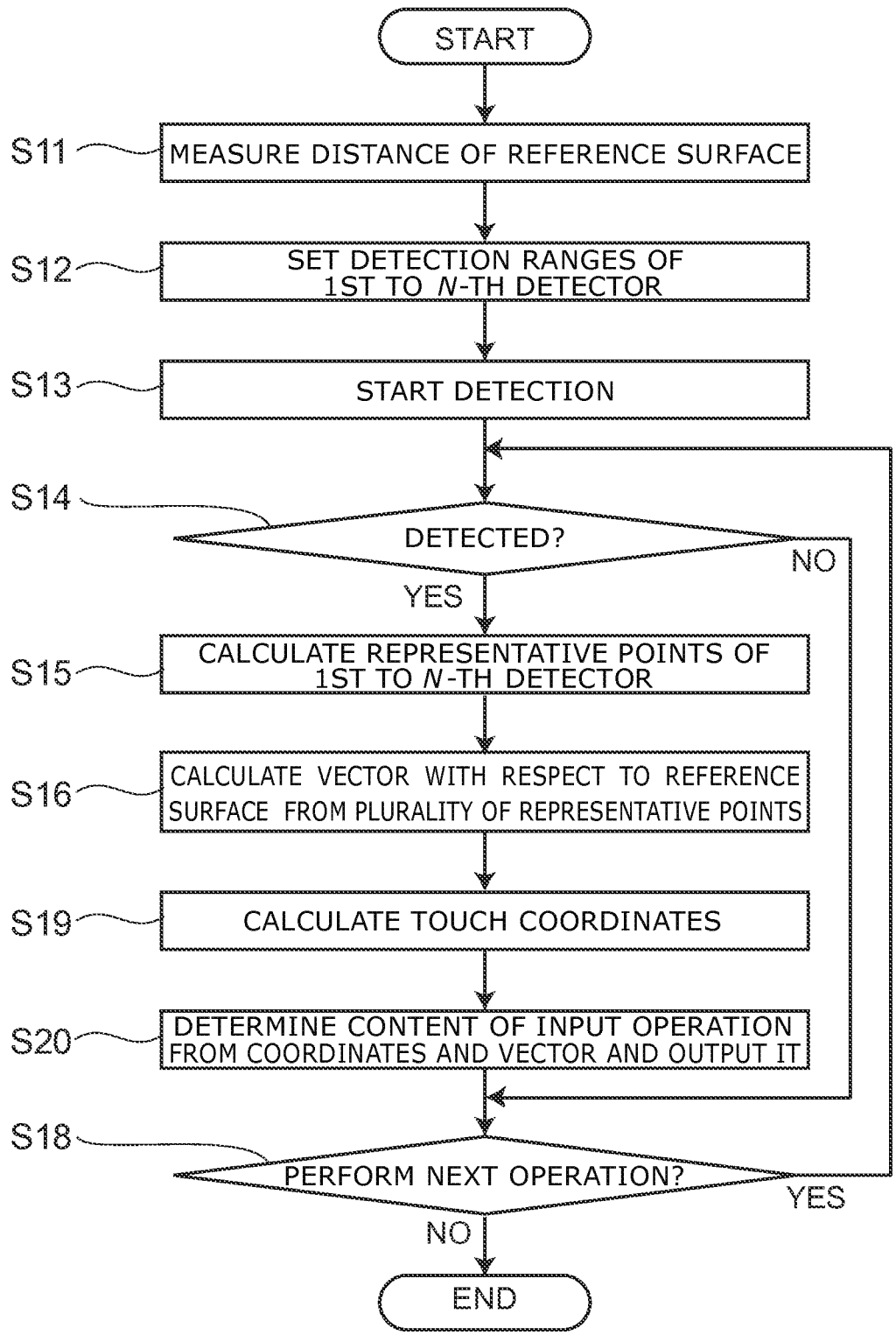
FIG. 11 is a flow chart showing a processing method of the embodiment.

FIG. 11 is a flow chart showing a processing method of the embodiment.

Figure 12:
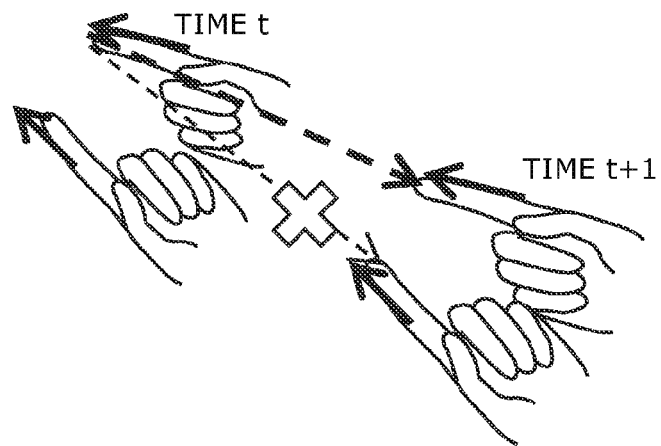
FIG. 12 is a schematic plan view illustrating an example in the case where touching is continued with two fingers.

FIG. 12 is a schematic plan view illustrating an example in the case where touching is continued with two fingers.

The processing method of step S11 to step S16 is similar to the processing method of step S11 to step S16 described above in regard to FIG. 2.

Subsequently, the coordinate calculator 500 calculates the touch coordinates (step S19). In the embodiment, a method for calculating the touch coordinates when the object 50 has touched the reference surface is described. The vector calculator 300 has calculated the three-dimensional vector $v_i$ with respect to the reference surface corresponding to the object 50. Hence, the touch coordinates can be expressed as $X_i=x^2_i+v_i$. The coordinates may be adjusted by adding the vector certain times. Here, by referring to the subscript "i", a plurality of objects 50 can be distinguished from one another. This means adaptability to multi-touching.

The coordinate calculator 500 may perform stabilization processing in the time direction (tracking) in order to suppress the fluctuation of the input coordinates. An IIR (infinite impulse response) filter, a Kalman filter, and the like may be used for this. In the case where an IIR filter is used, the touch coordinates at time t can be calculated by the following formula.

[Mathematical Formula 10]

$$X_i(t)=\beta \cdot (x_i^2(t)+v_i(t))+(1.0-\beta)X_i(t-1) \qquad \text{Formula (10)}$$

where $\beta$ is the time constant. When $\beta=1.0$, stabilization processing is not performed.

In the case where such tracking processing is performed, it is necessary to create associations between touch coordinates at different times. This may be made by a method such as associating points closest to each other. It is also possible to set the cost of associating and search a pair whereby the cost is minimized. In the embodiment, since the three-dimensional vector $v_i$ has been calculated, the angle information of the three-dimensional vector $v_i$ may be used. For example, as shown in FIG. 12, when touching is continued with two fingers, points of which the angles of the vectors are close to each other may be associated.

Here, as a touch coordinate calculation method of a comparative example, a method is proposed in which the representative point (barycenter) of a detected part is inputted as it is as the touch coordinates. In this case, "misalignment" will occur between the tip of the object (for example, a fingertip) and the touch coordinates, and it will be difficult for the user to make input to the intended position. To reduce the "misalignment", it is necessary to reduce the margin $Z_{margin}(x, y)$ provided in order not to detect noise and the detection range of the detected part. In this case, it is difficult to distinguish between the distance change due to noise and the distance change due to the object, and consequently the touch cannot be detected with good accuracy. Otherwise, false detection will occur.

In contrast, in the embodiment, the vector calculator 300 has calculated the three-dimensional vector $v_i$ with respect to the reference surface corresponding to the object 50. Hence, the coordinates of the fingertip (the tip of the object 50) can be made into the touch coordinates by simple processing. Furthermore, as compared to the touch coordinate calculation method of the comparative example described above, the margin $Z_{margin}(x, y)$ and the detection range of the detected part can be set wide and the stability of detection can be enhanced.

Subsequently, the determiner 400 determines the content of the input operation of the object 50 on the basis of the touch coordinates and the vector $v_i$, and outputs it to the computer 800 (step S20).

Subsequently, the processing method of step S18 is similar to the processing method of step S18 described above in regard to FIG. 2.

By the embodiment, in detecting touch operation, the touch coordinates of the fingertip can be detected stably even when the accuracy of the distance measurement means (for example, the distance sensor 100) is low, for example. Furthermore, since the three-dimensional angle and the direction of the user can be inputted from the three-dimensional vector $v_i$ corresponding to the object 50, various input means can be provided as compared to conventional input systems.

Figure 13:
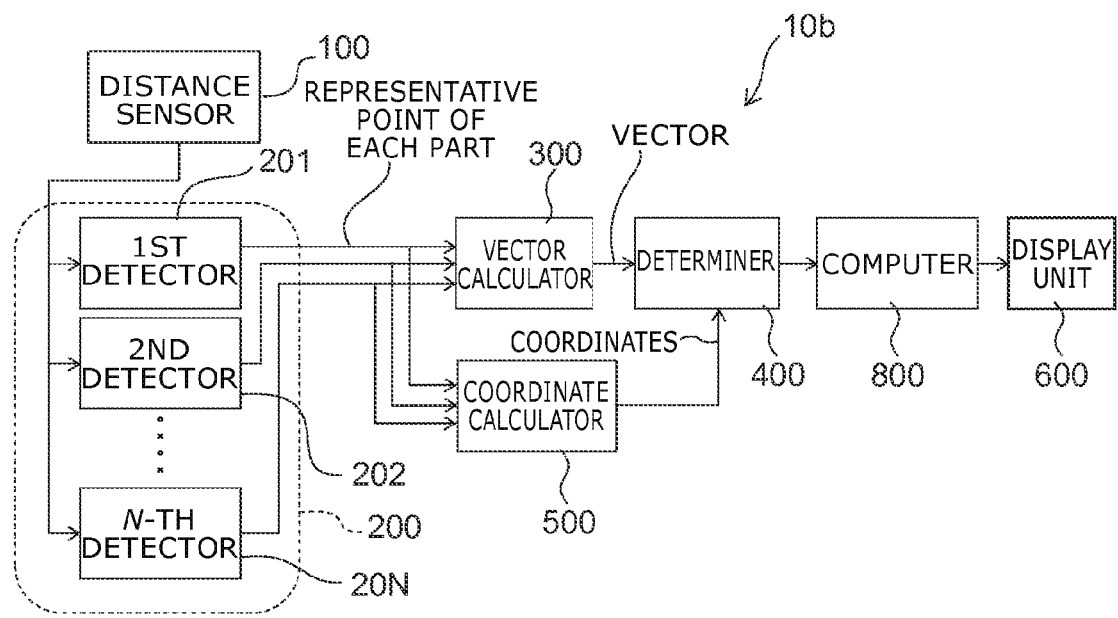
FIG. 13 is a block diagram showing an information processor according to yet another embodiment.

FIG. 13 is a block diagram showing an information processor according to yet another embodiment.

An information processor 10b shown in FIG. 13 further includes a display unit 600 as compared to the information processor 10a described above in regard to FIG. 10.

The display unit 600 is a means for displaying images, such as a display and a projector. The user can make input on the reference surface to operate the image displayed by the display unit 600. In the embodiment, a description is given using as an example the case where the display unit 600 is a projector (a projection unit) that projects images onto the reference surface such as a wall and the upper surface of a desk. However, the display unit 600 is not limited to a projector. The display unit 600 may be also a liquid crystal display or the like. The display unit 600 and the reference surface on which operation is inputted may be located in different places.

Otherwise, the configuration is similar to the configuration of the information processor 10a described above in regard to FIG. 10.

By the embodiment, a wall, the upper surface of a desk, etc. can be made an operable virtual display. For example, when the determiner 400 outputs touch operation, a wall, the upper surface of a desk, etc. can be made a virtual touch display.

Figure 14:
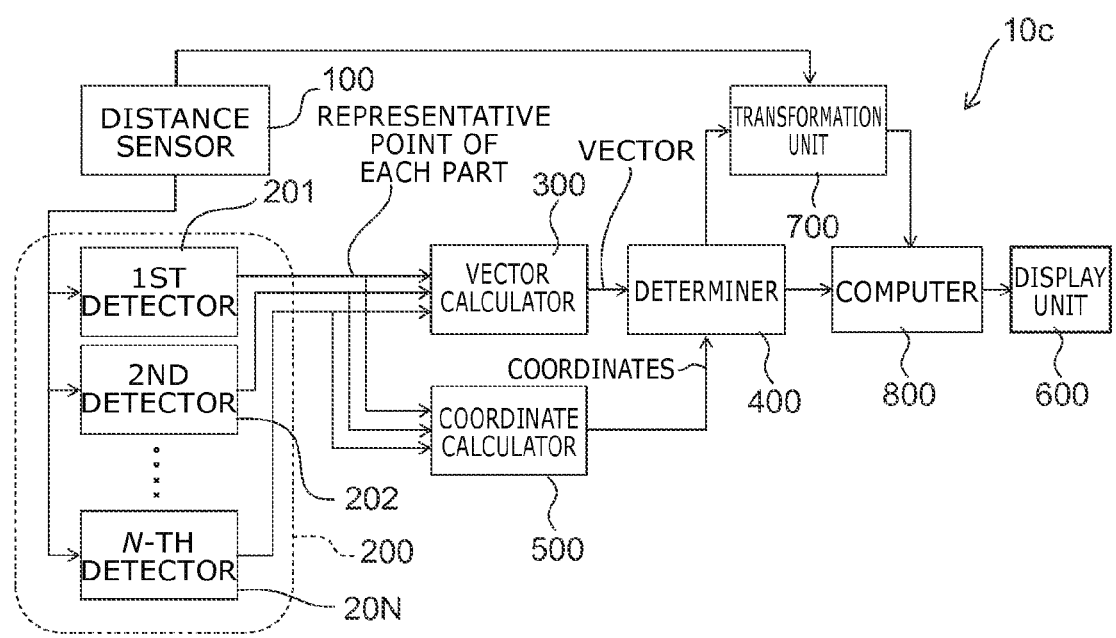
FIG. 14 is a block diagram showing an information processor according to yet another embodiment.

FIG. 14 is a block diagram showing an information processor according to yet another embodiment.

As described above in regard to FIG. 13, in the case where the information processor includes the display unit 600, a wall, the upper surface of a desk, etc. can be made an operable virtual display. However, when the coordinate system of the display unit 600 and the coordinate system of the distance sensor 100 are different, it is necessary to create an association between the coordinate systems. Specifically, a transformation to relate the coordinates $X_i$ calculated by the coordinate calculator 500 to the coordinate system in the display unit 600 is needed.

Figure 15:
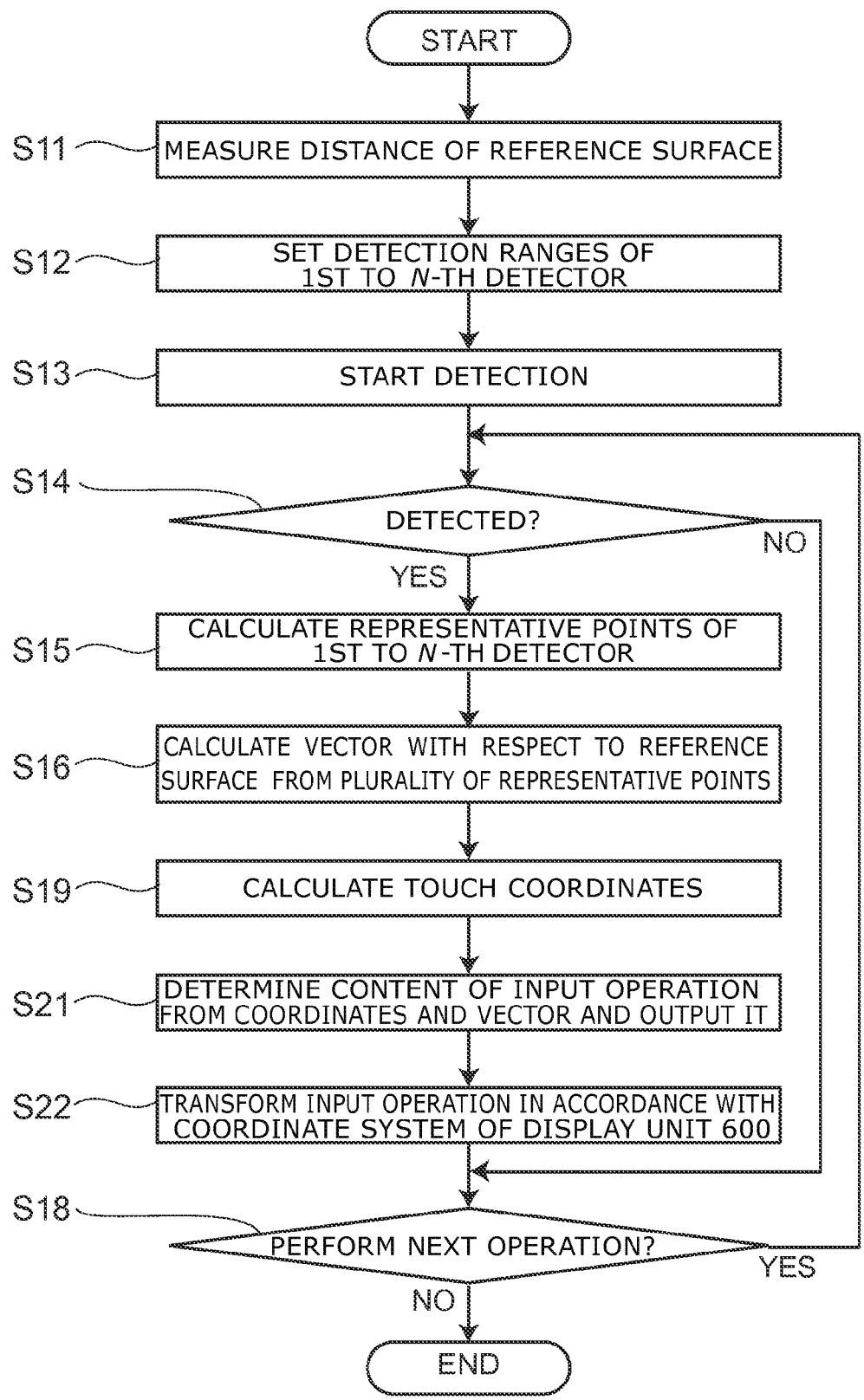
FIG. 15 is a flow chart showing a processing method of the embodiment.

In view of this, an information processor 10c shown in FIG. 14 further includes a transformation unit 700 as compared to the information processor 10b described above in regard to FIG. 13. The transformation unit 700 transforms the input operation determined by the determiner 400 in accordance with the coordinate system of the display unit 600. In other words, the transformation unit 700 makes a transformation like creating an association between the coordinate system of the display unit 600 and the coordinate system of the distance sensor 100. Thereby, on touching an image projected, it is possible to perform touch operation on a corresponding position in the projected image or to display a cursor, for example FIG. 15 is a flow chart showing a processing method of the embodiment.

Figure 16:
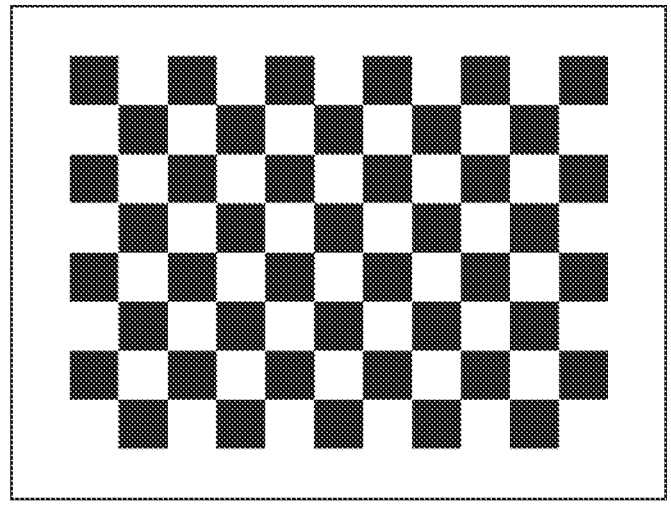
FIG. 16 is a schematic plan view illustrating an example of the pattern image for the calculation of corresponding points.

FIG. 16 is a schematic plan view illustrating an example of the pattern image for the calculation of corresponding points.

The processing method of step S11 to step S19 is similar to the processing method of step S11 to step S19 described above in regard to FIG. 2 and FIG. 11.

Subsequently, the determiner 400 determines the content of the input operation of the object 50 on the basis of the touch coordinates and the vector $v_i$, and outputs it to the transformation unit 700 (step S21). Subsequently, the transformation unit 700 transforms the input operation in accordance with the coordinate system of the display unit 600 (step S22).

In the embodiment, a method for associating the coordinate system of the display unit 600 and the coordinate system of the distance sensor 100 when the reference surface is a flat surface is described.

When the reference surface is a flat surface, the transformation of the coordinate system of the display unit 600 and the coordinate system of the distance sensor 100 can be expressed by a two-dimensional projection transformation of a linear matrix transformation. The matrix of 3×3 necessary for the two-dimensional projection transformation is expressed as H. The matrix H is called also a homography. When four sets or more of corresponding points can be acquired between the coordinate system of the display unit 600 and the coordinate system of the distance sensor 100, the matrix H can be calculated analytically.

These corresponding points may be set also manually. It is convenient to use a pattern like that shown in FIG. 16 whereby corresponding points can be automatically acquired easily. In the case of using a pattern like FIG. 16, corresponding points can be acquired easily by using a conventional corner detection means. Specifically, corresponding points can be automatically acquired by displaying a pattern image with the display unit 600 and capturing the pattern with a camera on which pre-calibrated with the coordinate system of the distance sensor 100. In the case of the pattern shown in FIG. 16 is reproduced with infrared light, infrared camera of distance sensor 100 can use for capturing and detection of pattern. Thereby, the matrix H can be calculated to transform the coordinates.

Next, a method for associating the coordinate system of the display unit 600 and the coordinate system of the distance sensor 100 when the reference surface is a non-flat surface is described.

When the display unit 600 is, for example, a projector, images can be displayed even on a non-flat surface. Thus, the reference surface is a non-flat surface, and cannot be handled by the two-dimensional projection transformation described above. In such a case, associating is made using a three-dimensional projection transformation. Specifically, the touch coordinates in the coordinate system of the distance sensor 100 are once reconstructed to coordinates in the real space (the world coordinate system), and are then re-projected on the coordinate system of the projector; thereby, an association of coordinates between the distance sensor 100 and the display unit 600 is created.

As a model for transforming the world coordinate system to image coordinates in a camera or a projector, the projection model of the following formula is generally known.

[Mathematical Formula 11]

$$\lambda \tilde{x} = A[R \mid T]\tilde{X} \quad \text{Formula (11)}$$

$$\tilde{X} = (X_1, X_2, X_3, X_4)^T: \text{ The homogeneous coordinates of the world coordinate system}$$

$$\tilde{x} = (x_1, x_2, x_3)^T: \text{ The homogeneous coordinates of the image coordinate system}$$

The world coordinates (X, Y, Z) are obtained in the form of $X=X_1/X_4$, $Y=X_2/X_4$, and $Z=X_3/X_4$. The image coordinates (x, y) are obtained in the form of $x=x_1/x_3$, and $y=x_2/x_3$. When coordinates are expressed by homogeneous coordinates, there is a property that the values of the world coordinates and the image coordinates do not change even when each component is multiplied by a certain number. The indefiniteness of the certain times is expressed by the coefficient λ.

A is the internal parameter matrix, and is determined from internal information such as the focal length and the resolution. R and T are matrices called the external parameter matrices, and are determined by the posture of the camera or the projector. These can be found beforehand by calibration.

The associating of coordinates between the display unit 600 and the distance sensor 100 based on the projection model described above will now be described.

First, the projection model of the display unit (in this example, a projector) 600 is defined as follows.

[Mathematical Formula 12]

$$\lambda_p \tilde{x}_p = A_p[R_p | T_p]\tilde{X} \quad \text{Formula (12)}$$

The projection model of the distance sensor is defined as follows.

[Mathematical Formula 13]

$$\lambda_c \tilde{x}_c = A_c[R_c | T_c]\tilde{X} \quad \text{Formula (13)}$$

Here, when the coordinates of the distance sensor 100 are taken as the origin of the world coordinate system, setting of $R_c=1$ and $T_c=0$ can be made. Since the distance $d(x_c, y_c)$ of the image coordinates $(x_c, y_c)$ can be acquired by the distance sensor 100, the indefiniteness of the certain times can be eliminated.

From the foregoing, the following formula can be obtained from Formula 13, and the associating of coordinates can be made even for a non-flat surface.

[Mathematical Formula 14]

$$\begin{bmatrix} X \\ Y \\ Z \end{bmatrix} = A_c^{-1} \begin{bmatrix} x_c \cdot d(x_c, y_c) \\ y_c \cdot d(x_c, y_c) \\ d(x_c, y_c) \end{bmatrix} \quad \text{Formula (14)}$$

Formula 14 means a transformation from the image coordinates of the distance sensor 100 (the right-hand side) to the world coordinates (the left-hand side).

Finally, the transformed world coordinates are substituted into the projection model of the projector; thus, a transformation from the image coordinates of the distance sensor 100 to the image coordinates of the projector can be made.

[Mathematical Formula 15]

$$\lambda_p \tilde{x}_p = A_p[R_p | T_p] \begin{bmatrix} A_c^{-1} \begin{bmatrix} x_c \cdot d(x_c, y_c) \\ y_c \cdot d(x_c, y_c) \\ d(x_c, y_c) \end{bmatrix} \\ 1 \end{bmatrix} \quad \text{Formula (15)}$$

In the above, associating methods when the projection surface is a flat surface and when the projection surface is a non-flat surface are described. However, the invention is not limited to them. For example, associating may be made manually beforehand.

By the embodiment, a wall, the upper surface of a desk, etc. can be made an operable virtual display without using a dedicated device such as an electronic pen and a sensor attached to the wall or the upper surface of the desk.

Figure 17:
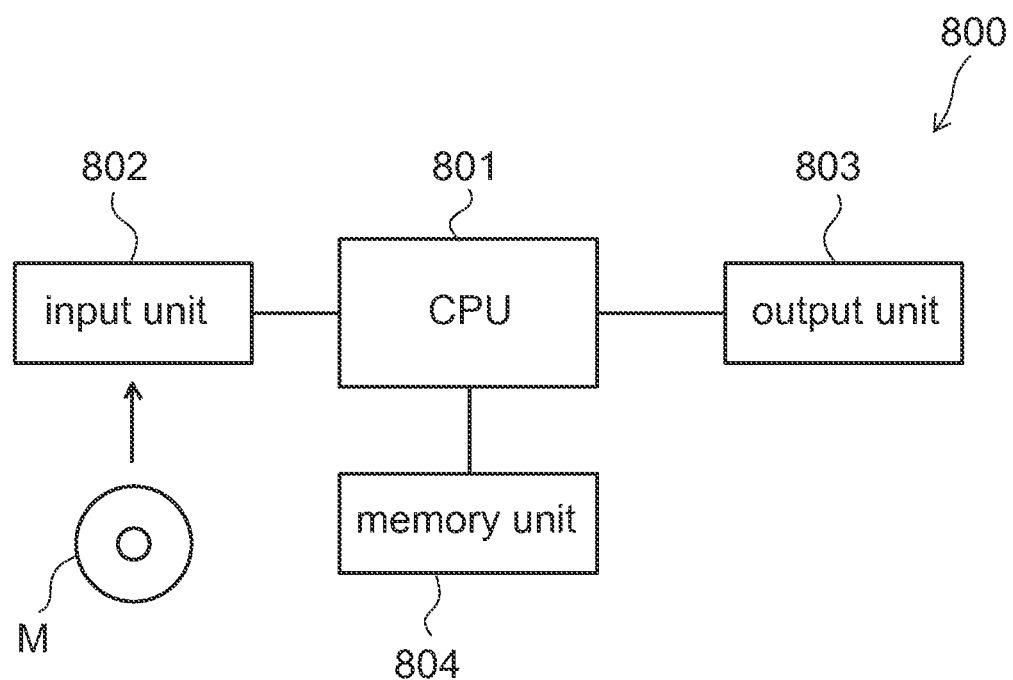
FIG. 17 is a block diagram illustrating an example of the computer of the embodiment.

FIG. 17 is a block diagram illustrating an example of the computer of the embodiment.

The computer 800 displays, for example, a line with a prescribed color, a prescribed kind of line, a prescribed figure, etc. on the display unit 600 on the basis of an operating signal outputted from the determiner 400.

The computer 800 includes a central processor (CPU) 801, an input unit 802, an output unit 803, and a memory unit 804. The input unit 802 includes a function of reading information recorded in a recording medium M.

The operating system (OS) and the projection system of the embodiment are stored in the memory unit 804. The central processor 801 determines and executes the content displayed on the display unit 600 on the basis of an operating signal outputted from the determiner 400 and the operating system.

The projection system of the embodiment may be recorded in a computer-readable recording medium M. The recording medium M may be a memory device such as a server connected to a network. The projection system of the embodiment may be distributed via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processor comprising one or more processors configured to at least:
    acquire a first point of a first part of an object and a second point of a second part of the object measured by a distance sensor, the distance sensor being apart from a reference surface and the object, the first part of the object existing in a first detection range, the second part of the object existing in a second detection range, the first detection range being defined by first and second planes having respective pre-defined first and second distances from the reference surface, the second detection range being different than the first detection range and being defined by third and fourth planes having respective pre-defined third and fourth distances from the reference surface, and an image being displayed on the reference surface;
    calculate a three-dimensional vector based on the first and the second points;
    calculate input coordinates of the object based on the three-dimensional vector and at least one of the first detection range and the second detection range, wherein the object is determined to contact the reference surface at a position corresponding to the input coordinates; and
    determine an input operation by the object based on the three-dimensional vector, the calculated input coordinates, and a position in the image corresponding to the input coordinates.

2. The information processor according to claim 1, wherein the one or more processors are configured to determine the input operation based on an angle of the three-dimensional vector.

3. The information processor according to claim 1, wherein the one or more processors are configured to determine a position of an operator operating the object based on an angle of the three-dimensional vector.

4. The information processor according to claim 1, wherein
the one or more processors are configured to determine at least two objects as a set corresponding to each other based on angles of the three-dimensional vectors when a plurality of objects is detected.

5. The information processor according to claim 1, wherein the one or more processors are further configured to determine the input operation based on one or both of the position of the input coordinates and a temporal change of the input coordinates.

6. The information processor according to claim 1, further comprising:
a projector configured to project the image to at least part of the reference surface.

7. The information processor according to claim 6, wherein the one or more processors are configured to:
transform the determined input operation in accordance with a coordinate system of the projection unit.

8. The information processor according to claim 6, wherein the one or more processors are configured to control the image to be projected by the projector according to the determined input operation.

9. The information processor according to claim 1, wherein the second distance and the third distance are the same.

10. The information processor according to claim 1, wherein the one or more processors are configured to calculate the position in the image corresponding to the input coordinates based on a transform between a coordinate system associated with the distance sensor and a coordinate system associated with the image.

11. A processing method comprising:
acquiring a first point of a first part of an object and a second point of a second part of the object measured by a distance sensor, the distance sensor being apart from a reference surface and the object, the first part of the object existing in a first detection range, the second part of the object existing in a second detection range, the first detection range being defined by first and second planes having respective pre-defined first and second distances from the reference surface, the second detection range being different than the first detection range and being defined by third and fourth planes having respective pre-defined third and fourth distances from the reference surface, and an image being displayed on the reference surface;
calculating a three-dimensional vector based on the first and the second points;
calculate input coordinates of the object based on the three-dimensional vector and at least one of the first detection range and the second detection range, wherein the object is determined to contact the reference surface at a position corresponding to the input coordinates; and
determining an input operation by the object based on the three-dimensional vector, the calculated input coordinates, and a position in the image corresponding to the input coordinates.

12. The processing method according to claim 11, wherein the input operation is determined based on an angle of the three-dimensional vector.

13. The processing method according to claim 11, wherein a position of an operator operating the object is determined based on an angle of the three-dimensional vector.

14. The processing method according to claim 11, wherein
at least two objects are determined as a set corresponding to each other based on angles of the three-dimensional vectors when a plurality of objects is detected.

15. The method according to claim 11, further comprising calculating the position in the image corresponding to the input coordinates based on a transform between a coordinate system associated with the distance sensor and a coordinate system associated with the image.

16. A projection system comprising:
a projector;
memory for storing computer readable program code; and
one or more processors in communication with the memory, the one or more processors being operative with the computer readable program code to at least:
acquire a first point of a first part of an object and a second point of a second part of the object measured by a distance sensor, the distance sensor being apart from a reference surface and the object, the first part of the object existing in a first detection range, the second part of the object existing in a second detection range, the first detection range being defined by first and second planes having respective pre-defined first and second distances from the reference surface, the second detection range being different than the first detection range and being defined by third and fourth planes having respective pre-defined third and fourth distances from the reference surface, and an image projected by the projector being displayed on the reference surface;
calculate a three-dimensional vector based on the first and the second points;
calculate input coordinates of the object based on the three-dimensional vector and at least one of the first detection range and the second detection range, wherein the object is determined to contact the reference surface at a position corresponding to the input coordinates; and
determine an input operation by the object based on the three-dimensional vector, the calculated input coordinates, and a position in the image corresponding to the input coordinates.

17. The system according to claim 16, wherein the one or more processors are operative with the computer readable code to determine the input operation based on an angle of the three-dimensional vector.

18. The system according to claim 16, wherein the one or more processors are operative with the computer readable code to determine a position of an operator operating the object based on an angle of the three-dimensional vector.

19. The system according to claim 16, wherein the one or more processors are operative with the computer readable code to determine at least two objects as a set corresponding to each other based on angles of the three-dimensional vectors when a plurality of objects is detected.

20. The projection system according to claim 16, wherein the one or more processors are operative with the computer readable code to calculate the position in the image corresponding to the input coordinates based on a transform between a coordinate system associated with the distance sensor and a coordinate system associated with the image.

* * * * *